US006292170B1

(12) United States Patent
Chang et al.

(10) Patent No.: US 6,292,170 B1
(45) Date of Patent: *Sep. 18, 2001

(54) DESIGNING COMPOUND FORCE SENSATIONS FOR COMPUTER APPLICATIONS

(75) Inventors: Dean C. Chang, Santa Clara; Louis B. Rosenberg, San Jose; Jeffrey R. Mallett, Boulder Creek, all of CA (US)

(73) Assignee: Immersion Corporation, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/270,223

(22) Filed: Mar. 15, 1999

Related U.S. Application Data

(63) Continuation-in-part of application No. 08/846,011, filed on Apr. 25, 1997, now Pat. No. 6,147,674, and a continuation-in-part of application No. 08/877,114, filed on Jun. 17, 1997, now Pat. No. 6,169,540, and a continuation-in-part of application No. 09/243,209, filed on Feb. 2, 1999.

(51) Int. Cl.⁷ .............................. G09G 5/00; G09G 5/08
(52) U.S. Cl. ...................... 345/156; 345/161; 345/163; 345/167; 345/146; 345/333; 463/37
(58) Field of Search ...................................... 345/156, 153, 345/161, 163, 146, 326, 333, 167; 318/568.11, 568.25; 74/471 XY; 463/30, 37, 38; 434/45; 395/99; 244/233

(56) References Cited

U.S. PATENT DOCUMENTS

| 3,919,691 | 11/1975 | Noll | 340/172.5 |
| 4,477,043 | 10/1984 | Repperger | 244/223 |

(List continued on next page.)

FOREIGN PATENT DOCUMENTS

| 0265011A1 | 4/1988 | (EP) . |
| 0626634A2 | 11/1994 | (EP) . |

(List continued on next page.)

OTHER PUBLICATIONS

L. Rosenberg, "A Force Feedback Programming Primer—For PC Gaming Peripherals Supporting I–Force 2.0 and Direct–X 5.0," Immersion Corporation 1997.

(List continued on next page.)

*Primary Examiner*—Bipin Shalwala
*Assistant Examiner*—Jimmy H. Nguyen
(74) *Attorney, Agent, or Firm*—James R. Riegel; Guy V. Tucker

(57) ABSTRACT

A design interface tool for designing force sensations for use with a host computer and force feedback interface device. A force feedback device is connected to a host computer that displays the interface tool. The user selects a type of force sensation and designs and defines physical characteristics of the selected force sensation using the interface tool. A graphical representation of the characterized force sensation is displayed. The user can include a plurality of force sensations in a compound force sensation, where the compound sensation is graphically displayed to indicate the relative start times and duration of each of the force sensations. The user can also easily adjust the start times and durations of the force sensations using the graphical representation. The force sensations are output to a user manipulandum of a force feedback device to be felt by the user, where the graphical representation is updated in conjunction with the output of the force sensation. The user can iteratively modify force sensation characteristics and feel the results. Sounds can also be graphically represented and synchronized with the designed compound forces.

30 Claims, 7 Drawing Sheets

U.S. PATENT DOCUMENTS

| | | | |
|---|---|---|---|
| 4,800,721 | 1/1989 | Cemenska et al. | 60/393 |
| 4,868,549 | 9/1989 | Affinito et al. | 340/710 |
| 4,896,554 | 1/1990 | Culver | 74/471 XY |
| 4,907,973 | 3/1990 | Hon | 434/262 |
| 4,935,728 | 6/1990 | Kley | 340/709 |
| 5,044,956 | 9/1991 | Behensky et al. | 434/45 |
| 5,076,517 | 12/1991 | Ferranti et al. | 244/228 |
| 5,103,404 | 4/1992 | McIntosh | 318/568.22 |
| 5,116,180 | 5/1992 | Fung et al. | 414/5 |
| 5,146,566 | 9/1992 | Hollis, Jr. et al. | 395/275 |
| 5,182,557 | 1/1993 | Lang | 341/20 |
| 5,185,561 | 2/1993 | Good et al. | 318/432 |
| 5,186,629 | 2/1993 | Rohen | 434/114 |
| 5,193,963 | 3/1993 | McAffee et al. | 414/5 |
| 5,220,260 | 6/1993 | Schuler | 318/561 |
| 5,223,776 | 6/1993 | Radke et al. | 318/568.1 |
| 5,235,868 | 8/1993 | Culver | 74/471 XY |
| 5,341,459 | 8/1994 | Backes | 395/95 |
| 5,354,162 | 10/1994 | Burdea et al. | 414/5 |
| 5,386,507 | 1/1995 | Teig et al. | 395/161 |
| 5,389,865 | 2/1995 | Jacobus et al. | 318/568.11 |
| 5,402,499 | 3/1995 | Robison et al. | 381/119 |
| 5,405,152 | 4/1995 | Katanics et al. | 273/438 |
| 5,414,337 | 5/1995 | Schuler | 318/561 |
| 5,451,924 | 9/1995 | Massimino et al. | 340/407.1 |
| 5,461,711 | 10/1995 | Wang et al. | 395/161 |
| 5,482,051 | 1/1996 | Reddy et al. | 128/733 |
| 5,513,100 | 4/1996 | Parker et al. | 364/167.01 |
| 5,526,480 | 6/1996 | Gibson | 395/154 |
| 5,550,562 | 8/1996 | Aoki et al. | 345/163 |
| 5,565,840 | 10/1996 | Thorner et al. | 340/407.1 |
| 5,576,727 | 11/1996 | Rosenberg et al. | 345/179 |
| 5,589,854 | 12/1996 | Tsai | 345/161 |
| 5,596,347 | 1/1997 | Robertson et al. | 345/145 |
| 5,625,576 | 4/1997 | Massie et al. | 364/578 |
| 5,629,594 | 5/1997 | Jacobus et al. | 318/568.11 |
| 5,642,469 | 6/1997 | Hannaford et al. | 395/99 |
| 5,643,087 | 7/1997 | Marcus et al. | 463/38 |
| 5,666,138 | 9/1997 | Culver | 345/161 |
| 5,666,473 | 9/1997 | Wallace | 345/420 |
| 5,684,722 | 11/1997 | Thorner et al. | 364/578 |
| 5,691,898 * | 11/1997 | Rosenberg et al. | 364/190 |
| 5,709,219 | 1/1998 | Chen et al. | 128/782 |
| 5,714,978 | 2/1998 | Yamanaka et al. | 345/157 |
| 5,715,412 | 2/1998 | Aritsuka et al. | 395/326 |
| 5,717,869 * | 2/1998 | Moran et al. | 395/339 |
| 5,721,566 | 2/1998 | Rosenberg et al. | 345/161 |
| 5,734,373 | 3/1998 | Rosenberg et al. | 345/161 |
| 5,736,978 * | 4/1998 | Hasser et al. | 345/173 |
| 5,739,811 | 4/1998 | Rosenberg et al. | 345/161 |
| 5,742,278 * | 4/1998 | Chen et al. | 345/156 |
| 5,754,023 | 5/1998 | Rosten et al. | 318/561 |
| 5,755,577 | 5/1998 | Gillio | 434/262 |
| 5,760,764 | 6/1998 | Martinelli | 345/160 |
| 5,760,788 | 6/1998 | Chainini et al. | 345/474 |
| 5,767,839 | 6/1998 | Rosenberg | 345/161 |
| 5,769,640 | 6/1998 | Jacobus et al. | 424/262 |
| 5,781,172 | 7/1998 | Engel et al. | 345/164 |
| 5,784,052 | 7/1998 | Keyson | 345/167 |
| 5,790,108 | 8/1998 | Salcudean et al. | 345/184 |
| 5,802,353 | 9/1998 | Avila et al. | 395/500 |
| 5,805,140 | 9/1998 | Rosenberg et al. | 345/161 |
| 5,808,601 | 9/1998 | Leah et al. | 345/145 |
| 5,825,308 | 10/1998 | Rosenberg | 341/20 |
| 5,831,408 | 11/1998 | Jacobus et al. | 318/568.11 |
| 5,844,392 | 12/1998 | Peurach et al. | 318/568.17 |
| 5,857,986 | 1/1999 | Moriyasu | 601/49 |
| 5,889,670 | 3/1999 | Schuler et al. | 364/186 |
| 5,956,484 | 9/1999 | Rosenberg et al. | 395/200.33 |
| 5,959,613 | 9/1999 | Rosenberg et al. | 345/161 |
| 5,973,689 | 10/1999 | Gallery | 345/339 |
| 6,001,014 | 12/1999 | Ogata et al. | 463/37 |
| 6,004,134 | 12/1999 | Marcus et al. | 434/45 |
| 6,005,551 | 12/1999 | Osborne et al. | 345/161 |
| 6,020,876 | 2/2000 | Rosenberg et al. | 345/157 |
| 6,028,593 | 2/2000 | Rosenberg et al. | 345/156 |
| 6,078,308 | 6/2000 | Rosenberg et al. | 345/145 |
| 6,088,017 | 7/2000 | Tremblay et al. | 345/156 |
| 6,111,577 | 8/2000 | Zilles et al. | 345/355 |
| 6,125,385 | 9/2000 | Wies et al. | 709/203 |
| 6,131,097 | 10/2000 | Peurach et al. | 707/102 |
| 6,147,674 | 11/2000 | Rosenberg et al. | 345/157 |
| 6,169,540 | 1/2001 | Rosenberg et al. | 345/326 |

FOREIGN PATENT DOCUMENTS

| | | | |
|---|---|---|---|
| 0875819 | 11/1998 | (EP) | G06F/3/00 |
| WO9502801 | 1/1995 | (WO) | |
| WO9520788 | 8/1995 | (WO) | |
| WO9532459 | 11/1995 | (WO) | |
| WO9721160 | 6/1997 | (WO) | |
| WO9731333 | 8/1997 | (WO) | |
| WO9849614 | 11/1998 | (WO) | |
| WO9858308 | 12/1998 | (WO) | |

OTHER PUBLICATIONS

Yokokohji, et al., "What You Can See is What You Can Feel—Development of a Visual/Haptic Interface to Virtual Environment," 0–8186–7295 IEEE, Jan. 1996.

Ouh–young, Ming et al., "Creating an Illusion of Feel: Control Issues in Force Display," University of N. Carolina, 1989, pp. 1–14.

Colgate, J. Edward et al., "Implementation of Stiff Virtual Walls in Force–Reflecting Interfaces," Northwestern University, 1993.

Kelley et al., Magic Mouse: Tactile & Kinesthetic Feedback in the Human–Computer Interface using an Electromagnetically Acutuated Input/Output Device, 1993, University British Columbia.

Hirota et al., "Development Of Surface Display," University Tokyo, IEEE, 1993, pp. 256–262.

Payette et al., "Evaluation Of Force Feedback Computer Pointing device in Zero Gravity," DSC—vol. 58, Proc. of ASME Dynamics Systems and Control Division, 1996, pp. 547–553.

Russo, Massimo, "The Design & Implementation of a Three Degree of Freedom Force Output Joystick," Dept. of Mech. Engineering, 1990, pp. 1–40.

Schmult, B. et al., "Application Areas for a Force–Feedback Joystick," DSC—vol. 49, Advances in Robotics Mechatronics, and Haptic Interfaces, ASME 1993, pp. 47–54.

Atkinson, W. et al., "Computing with Feeling," Comp. & Graphics, vol. 2, 1976, pp. 97–103.

Kelley et al., "On the Development of a Force–Feedback Mouse & It's Integration into a Graphical User Interface," Int'l Mechanical Engineering Congress and Exhibition, 1994, pp. 1–8.

Minsky, Margaret et al., "Feeling & Seeing: Issues in Force Display," ACM 1990, pp. 235–242, 270.

Rosenberg et al., "The use of force feedback to enhance graphical user interfaces," Stereoscopic Displays and Virtual Reality Systems, Proc. SPIE, 1996, pp. 243–248.

Hannaford et al., "Force Feedback Cursor Control," NASA Tech Brief, vol. 13, No. 11, Item #21, 1989, pp. 1–4.

Brooks Jr., Frederick et al., "Project GROPE—Haptic Displays for Scientific Visualization," Computer Graphics, vol. 24, No. 4, 1990, pp. 177–185.

Adelstein, B. et al., "Design & Implementation of a Force Reflecting Manipulandum for Manual Control Research," NASA Ames Research, 1992, pp. 1–24.

Winey III et al., "Computer Simulated Visual & Tactile Feedback as an aid to Manipulator & Vehicle Control," MIT, 1981, pp. 1–79.

Kilpatrick et al., "The Use of Kinesthetic Supplement in an Interactive Graphics System," University of North Carolina, 1976, pp. 1–174.

Rosenberg et al., "Perceptual Decomposition of Virtual Haptic Surfaces," Proc. IEEE Symposium on Research Frontiers in Virtual Reality, 1993.

Rosenberg, "Virtual haptic Overlays enhance performance in telepresence tasks," Stanford University, 1994.

Ouh–Young et al., "Using A Manipulator for Force Display in Molecular Docking,", University North Carolina, IEEE 1988, pp. 1824–1829.

Bejczy et al., "The Phantom Robot: Predictive Displays for Teleoperation with Time Delay,", CA Institute of Technology, IEEE 1990, pp. 546–550.

Munch et al., "Intelligent Control for Haptic Displays," Eurographics '96, Blackwell Publishers, vol. 15, No. 3, 1996, pp. C–217–226.

Akamatsu et al., "Multimodal Mouse: A Mouse–Type Device with Tactile & Force Display," Presence, vol. 3, No. 1, 1994, pp. 73–80.

Tan, Hong et al., "Human Factors for the Design of Force–Reflecting Haptic Interfaces," MIT, 1994.

Jones, L.A. et al., "A Perceptual Analysis of Stiffness," Expeerimental Brain Research (1990) 79:150–156.

Hiroo Iwata, "Artificial Reality with Force–Feedback: Development of Desktop Virtual Space with Compact Master Manipulator," Computer Graphics, vol. 24, No. 4, 1990, pp. 165–170.

Rosenberg et al., "Commercially Viable Force Feedback Controller for Individuals with Neuromotor Disabilities," Crew Systems Directorate, AL/CF–TR–1997–0016, 1996, pp. 1–33.

Su, S. Augustine et al., "The Virtual Panel Architecture: A 3D Gesture Framework," IEEE 1993, pp. 387–393.

Rosenberg, L., "Perceptual Design of a Virtual Rigid Surface Contact," Air Force Materiel Command, AL/CF–TR–1995–0029, 1993, pp. 1–39.

Rosenberg, L., "The Use of Fixtures to Enhance Operator Performance in Time Delayed Teleoperation," Air Force Materiel Command, AL/CF–TR–1994–0139, 1993, pp. 1–45.

SensAble Technologies, Inc., Ghost SDK Programmer's Guide, Vers. 3.0, Rev. 1.2 Jan. 3, 1999, pp. 1–1 to F–1.

* cited by examiner

DESIGNING COMPOUND FORCE SENSATIONS FOR COMPUTER APPLICATIONS

CROSS REFERENCE TO RELATED APPLICATIONS

This application is a continuation-in-part of co-pending parent patent applications Ser. No. 08/846,011, now U.S. Pat. No. 6,147,674 filed Apr. 25, 1997, entitled, "Method and Apparatus for Designing and Controlling Force Sensations in Force Feedback Computer Applications"; Ser. No. 08/877,114, now U.S. Pat No. 6,169,540, filed Jun. 17, 1997, entitled, "Method and Apparatus for Designing Force Sensations in Force Feedback Computer Applications"; and Ser. No. 09/243,209, filed Feb. 2, 1999, entitled, "Designing Force Sensations for Computer Applications Including Sounds," all of which are incorporated by reference herein in their entirety.

BACKGROUND OF THE INVENTION

The present invention relates generally to interface devices for allowing humans to interface with computer systems, and more particularly to computer interface devices that provide input from the user to computer systems and implement force feedback to the user.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, stylus, tablet, pressure-sensitive ball, or the like, that is connected to the computer system controlling the displayed environment. Typically, the computer updates the environment in response to the user's manipulation of a user-manipulatable physical object such as a joystick handle or mouse, and provides visual and audio feedback to the user utilizing the display screen and audio speakers. The computer senses the user's manipulation of the user object through sensors provided on the interface device that send locative signals to the computer.

In some interface devices, haptic feedback is also provided to the user, also known as "force feedback." These types of interface devices can provide physical sensations which are felt by the user manipulating a user manipulable object of the interface device. For example, the Force-FX joystick controller from CH Products, Inc. or the Wingman Force joystick from Logitech, Inc. may be connected to a computer and provides forces to a user of the controller. Other systems might use a force feedback mouse controller. One or more motors or other actuators are used in the device and arc connected to the controlling computer system. The computer system controls forces on the joystick in conjunction and coordinated with displayed events and interactions by sending control signals or commands to the actuators. The computer system can thus convey physical force sensations to the user in conjunction with other supplied feedback as the user is grasping or contacting the joystick or other object of the interface device. For example, when the user moves the manipulatable object and causes a displayed cursor to interact with a different displayed graphical object, the computer can issue a command that causes the actuator to output a force on the user object, conveying a feel sensation to the user.

A problem with the prior art development of force feedback sensations in software is that the programmer of force feedback applications does not have an intuitive sense as to how forces will feel when adjusted in certain ways, and thus must go to great effort to develop characteristics of forces that are desired for a specific application. For example, a programmer may wish to create a specific spring and damping force sensation between two graphical objects, where the force sensation has a particular stiffness, play, offset, etc. In current force feedback systems, the programmer must determine the parameters and characteristics of the desired force by a brute force method, by simply setting parameters, testing the force, and adjusting the parameters in an iterative fashion. This method can be cumbersome because it is often not intuitive how a parameter will affect the feel of a force as it is actually output on the user object; the programmer often may not even be close to the desired force sensation with initial parameter settings. Other types of forces may not be intuitive at all, such as a spring having a negative stiffness, and thus force sensation designers may have a difficult time integrating these types of sensations into software applications.

Furthermore, designers may have a difficult time synchronizing force sensations with each other, especially compound force sensations which include multiple individual force sensations. For example, a particular force sensation such as a collision may be accompanied by another force sensation such as an "earthquake" vibration. It can often be difficult to coordinate multiple simultaneous force sensations, especially when each of the force sensations starts and stops at different times and has a different duration.

SUMMARY OF THE INVENTION

The present invention is directed to designing force sensations output by a force feedback interface device. A controlling host computer provides a design interface tool that allows intuitive and simple design of a variety of force sensations and also allows multiple force sensations to be included in a compound force sensation.

More particularly, a design interface for designing force sensations for use with a force feedback interface device is described. The force sensation design interface is displayed on a display device of a host computer. Input from a user selects one or more force sensations to be commanded by a host computer and output by a force feedback interface device. Each force sensation preferably is provided with its own design parameters and design window, and the user can design and define physical characteristics of the selected force sensations. A graphical representation of the characterized force sensation is displayed on a display device of the host computer. Multiple force sensations can be included in a compound force sensation based on input received from the user, and a time-based graphical representation of the compound force sensation is displayed. For example, the time-based graphical representation can include a bar graph for each of the individual force sensations in the compound sensation indicating a start time and duration of each of the individual force sensations relative to each other. Multiple such compound force sensations can be designed and displayed simultaneously.

Preferably, the compound force sensation is output by the force feedback interface device coupled to the host computer to the manipulandum in conjunction with updating the graphical demonstration of the compound force sensation. The graphical representation provides the user with a visual demonstration of the individual force sensations included in the compound force sensation. Changes to at least one of the individual force sensations can be made by the user after the compound force sensation is output and the changes are displayed in the compound graphical representation. The user can also easily adjust the start times and durations of the individual force sensations using the graphical representation. Thus, in an iterative process, the user can design effective compound force sensations through actual experience of those sensations. The design interface can be implemented using program instructions stored on a computer-readable medium. In addition, one or more sounds can be assigned to individual force sensations in the compound force effect or can be assigned to the compound force effect directly. The sounds can preferably be displayed alongside the individual forces in the compound graphical representation.

The present invention advantageously provides a simple, easy-to-use design interface tool for designing force feedback sensations. Given the large variety of possible force sensations and the often unexpected results when modifying the several parameters of force sensations, the design interface tool of the present invention meets the needs of force sensation designers that wish to create force sensations as close to their needs as possible. The graphical design interface of the present invention allows a force sensation designer to easily, intuitively, and simultaneously design and modify individual force sensations and compound force sensations that include multiple different individual force sensations and arrange those individual force sensations to be output at desired times with respect to each other, allowing more effective force feedback to be implemented in games, simulations, graphical interfaces, and other applications.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
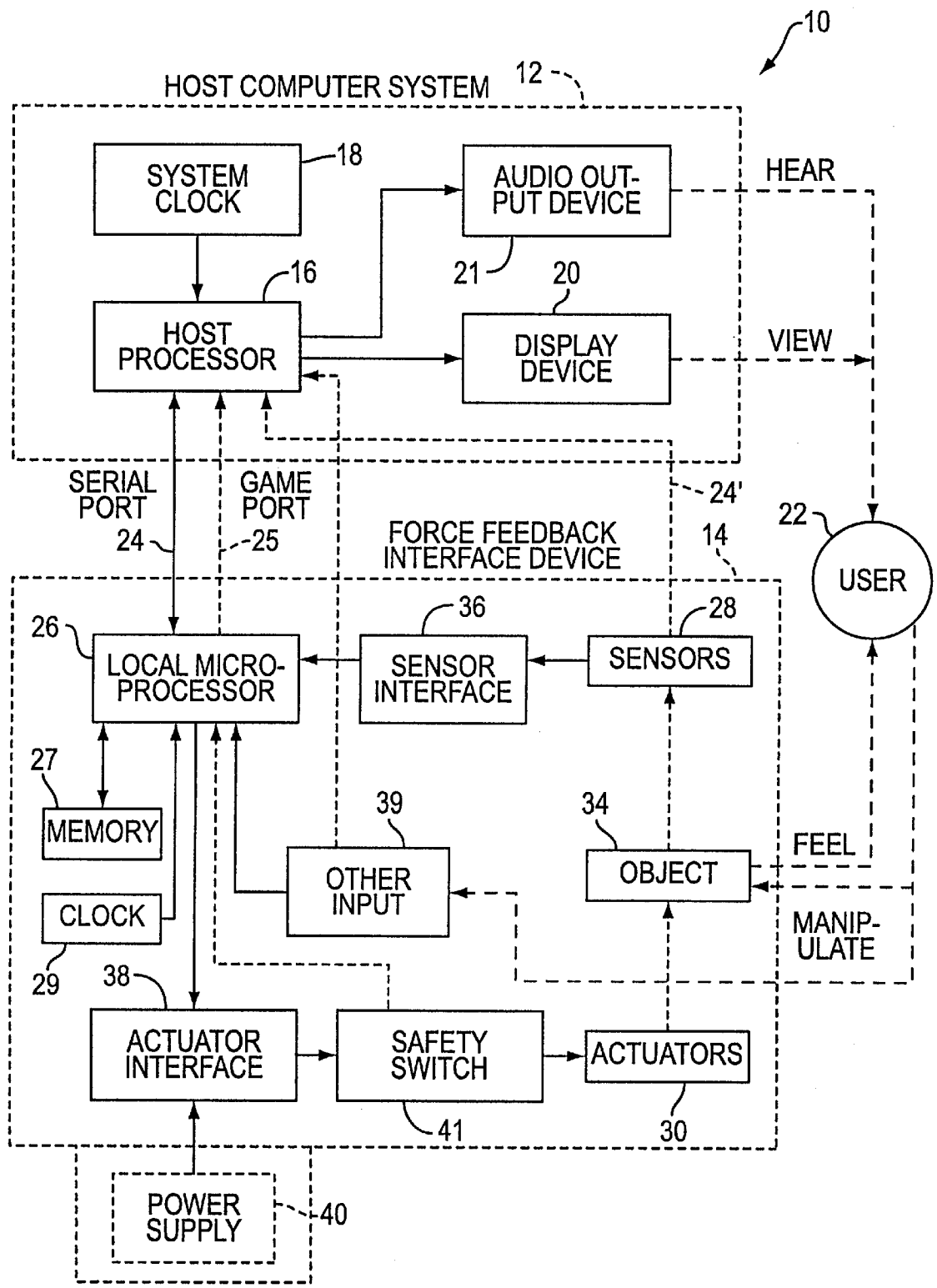
FIG. 1 is a block diagram of a system for controlling a force feedback interface device suitable for use with the present invention.

FIG. 1 is a block diagram illustrating a force feedback interface system 10 for use with the present invention controlled by a host computer system. Interface system 10 includes a host computer system 12 and an interface device 14.

Host computer system 12 is preferably a personal computer, such as an IBM-compatible or Macintosh personal computer, or a workstation, such as a SUN or Silicon Graphics workstation. Alternatively, host computer system 12 can be one of a variety of home video game systems, such as systems available from Nintendo, Sega, or Sony, a television "set top box" or a "network computer", etc. Host computer system 12 preferably implements a host application program with which a user 22 is interacting via peripherals and interface device 14. For example, the host application program can be a video game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Display screen 20 can be used to display images generated by host computer system 12 or other computer systems, and can be a standard display screen, CRT, flat-panel display, 3-D goggles, or any other visual interface. Audio output device 21, such as speakers, is preferably coupled to host microprocessor 16 via amplifiers, filters, and other circuitry well known to those skilled in the art (e.g. in a sound card) and provides sound output to user 22 from the host computer 18. Other types of peripherals can also be coupled to host processor 16, such as storage devices (hard disk drive, CD ROM/DVD-ROM drive, floppy disk drive, etc.), printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bi-directional bus 24. The bi-directional bus sends signals in either direction between host computer system 12 and the interface device. An interface port of host computer system 12, such as an RS232 or Universal Serial Bus (USB) serial interface port, parallel port, game port, etc., connects bus 24 to host computer system 12.

Interface device 14 includes a local microprocessor 26, sensors 28, actuators 30, a user object 34, optional sensor interface 36, an optional actuator interface 38, and other optional input devices 39. Local microprocessor 26 is coupled to bus 24 and is considered local to interface device 14 and is dedicated to force feedback and sensor I/O of interface device 14. Microprocessor 26 can be provided with software instructions to wait for commands or requests from computer host 16, decode the command or request, and handle/control input and output signals according to the command or request. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer system 12 provides high level supervisory commands to microprocessor 26 over bus 24, and microprocessor 26 manages low level force control loops to sensors and actuators in accordance with the high level commands and independently of the host computer 18. The force feedback system thus provides a host control loop of information and a local control loop of information in a distributed control system. This operation is described in greater detail in U.S. Pat. No. 5,739,811 and patent application Ser. Nos. 08/877,114 and 08/050,665 (which is a continuation of U.S. Pat. No. 5,734,373), all incorporated by reference herein. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data.

Sensors 28 sense the position, motion, and/or other characteristics of a user object 34 of the interface device 14 along one or more degrees of freedom and provide signals to microprocessor 26 including information representative of those characteristics. Rotary or linear optical encoders, potentiometers, optical sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12.

Actuators 30 transmit forces to user object 34 of the interface device 14 in one or more directions along one or more degrees of freedom in response to signals received from microprocessor 26. Actuators 30 can include two types: active actuators and passive actuators. Active actuators include linear current control motors, stepper motors, pneumatic/hydraulic active actuators, a torquer (motor with limited angular range), a voice coil actuators, and other types of actuators that transmit a force to move an object. Passive actuators can also be used for actuators 30, such as magnetic particle brakes, friction brakes, or pneumatic/hydraulic passive actuators. Actuator interface 38 can be optionally connected between actuators 30 and microprocessor 26 to convert signals from microprocessor 26 into signals appropriate to drive actuators 30.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

User manipulable object 34 ("user object" or "manipulandum") is a physical object, device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons.

The user 22 can manipulate and move the object along provided degrees of freedom to interface with the host application program the user is viewing on display screen 20. Object 34 can be a joystick handle, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other article.

Figure 2:
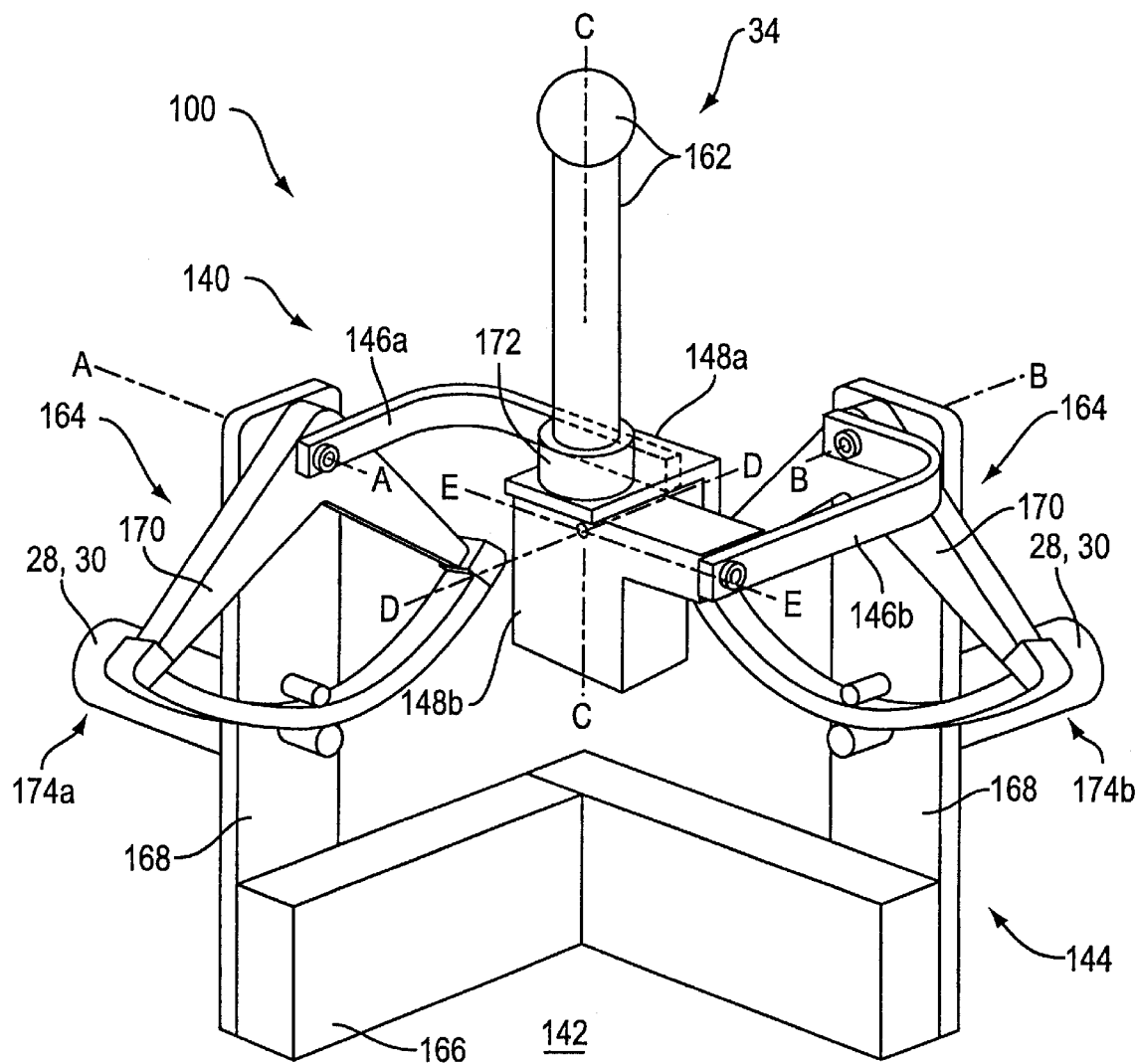
FIG. 2 is a perspective view of an embodiment of a mechanism for interfacing a user manipulatable object with the force feedback device of FIG. 1.

FIG. 2 is a perspective view of one embodiment of a mechanical apparatus 100 suitable for providing mechanical input and output to host computer system 12. Apparatus 100 is appropriate for a joystick or similar user object 34. Apparatus 100 includes gimbal mechanism 140, sensors 28 and actuators 30. User object 34 is shown in this embodiment as a joystick having a grip portion 162.

Figure 4:
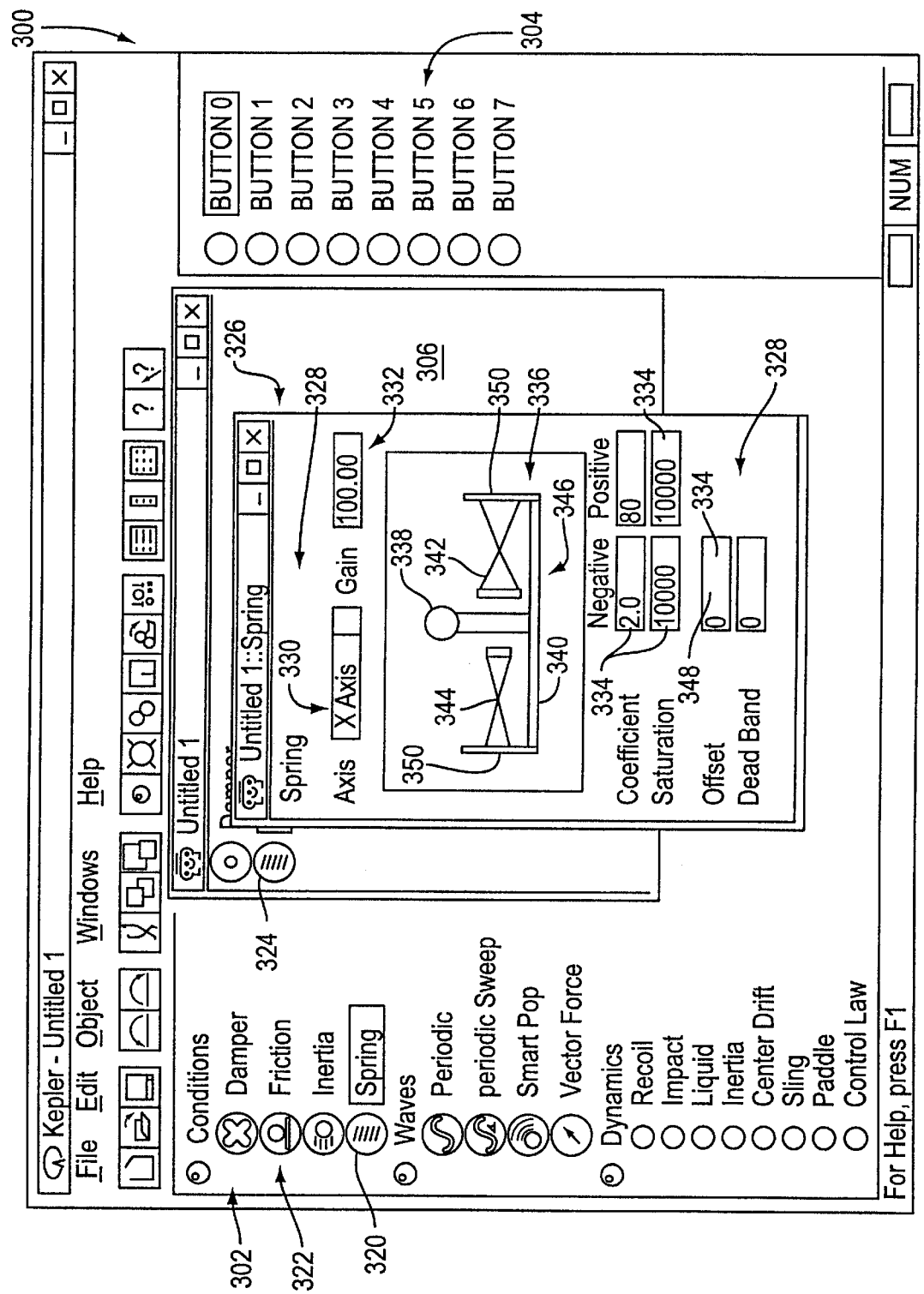
FIG. 4 is a diagram of the interface of FIG. 3 in which a design window for a spring condition is displayed.

Gimbal mechanism 140 provides two rotary degrees of freedom to object 34. A gimbal device as shown in FIG. 4 is described in greater detail U.S. Pat. No. 5,767,839, incorporated herein by reference in its entirety. Gimbal mechanism 140 provides support for apparatus 100 on grounded surface 142, such as a table top or similar surface. Gimbal mechanism 140 is a five-member linkage that includes a ground member 144, extension members 146a and 146b, and central members 148a and 148b. Gimbal mechanism 140 also includes capstan drive mechanisms 164.

Ground member 144 includes a base member 166 and vertical support members 168. Base member 166 is coupled to grounded surface 142. The members of gimbal mechanism 140 are rotatably coupled to one another through the use of bearings or pivots. Extension member 146a is rigidly coupled to a capstan drum 170 and is rotated about axis A as capstan drum 170 is rotated. Likewise, extension member 146b is rigidly coupled to the other capstan drum 170 and can be rotated about axis B. Central drive member 148a is rotatably coupled to extension member 146a and can rotate about floating axis D, and central link member 148b is rotatably coupled to an end of extension member 146b at a center point P and can rotate about floating axis E. Central drive member 148a and central link member 148b are rotatably coupled to each other at the center of rotation of the gimbal mechanism, which is the point of intersection P of axes A and B. Bearing 172 connects the two central members 148a and 148b together at the intersection point P. Sensors 28 and actuators 30 are coupled to the ground member 144 and to the members 146 through the capstan drum 170.

Gimbal mechanism 140 provides two degrees of freedom to an object 34 positioned at or near to the center point P of rotation, where object 34 can be rotated about axis A and/or B. In alternate embodiments, object 34 can also be rotated or translated in other degrees of freedom, such as a linear degree of freedom along axis C or a rotary "spin" degree of freedom about axis C, and these additional degrees of freedom can be sensed and/or actuated. In addition, a capstan drive mechanism 164 can be coupled to each vertical member 168 to provide mechanical advantage without introducing friction and backlash to the system.

Other types of mechanisms can be used in other embodiments, e.g. for a joystick, mouse, steering wheel, trackball, pool cue, or other force feedback interface device; some examples of mechanisms and devices are disclosed in patent application Ser. Nos. 08/877,114; 08/961,790; (now U.S. Pat. No. 6,020,875) 08/965,720; and 09/058,259, (now U.S. Pat. No. 6,140,382) all incorporated by reference herein.

Design of Force Feedback Sensations

Because force feedback devices can produce such a wide variety of feel sensations, each with its own unique parameters, constraints, and implementation issues, the overall spectrum of force sensations has been divided herein into subsets. Herein, three classes of feel sensations are provided: spatial conditions ("conditions"), temporal effects ("effects" or "waves"), and dynamic sensations ("dynamics"). Conditions are force sensations that arc a function of user motion of the manipulatable object 34, effects are force sensations that are played back over time independently of user object position or motion, and dynamics are force sensations that are based on an interactive dynamic model of motion and time. These three types of force sensations are described in greater detail in parent application Ser. No. 08/846,011, incorporated by reference herein. Preferred standard types of conditions include springs, dampers, inertia, friction, texture, and walls. Three basic types of effects include periodic, constant force (vector force), and ramp. Dynamic sensations involve real-time physical interactions based on 1) user motion and 2) a physical system wherein user motion during the interaction affects the behavior of the physical system. Each dynamic sensation, for example, can be based on a simulated basic physical system including a dynamic mass that is connected to the user object 34 by a simulated spring and a simulated damper.

Figure 3:
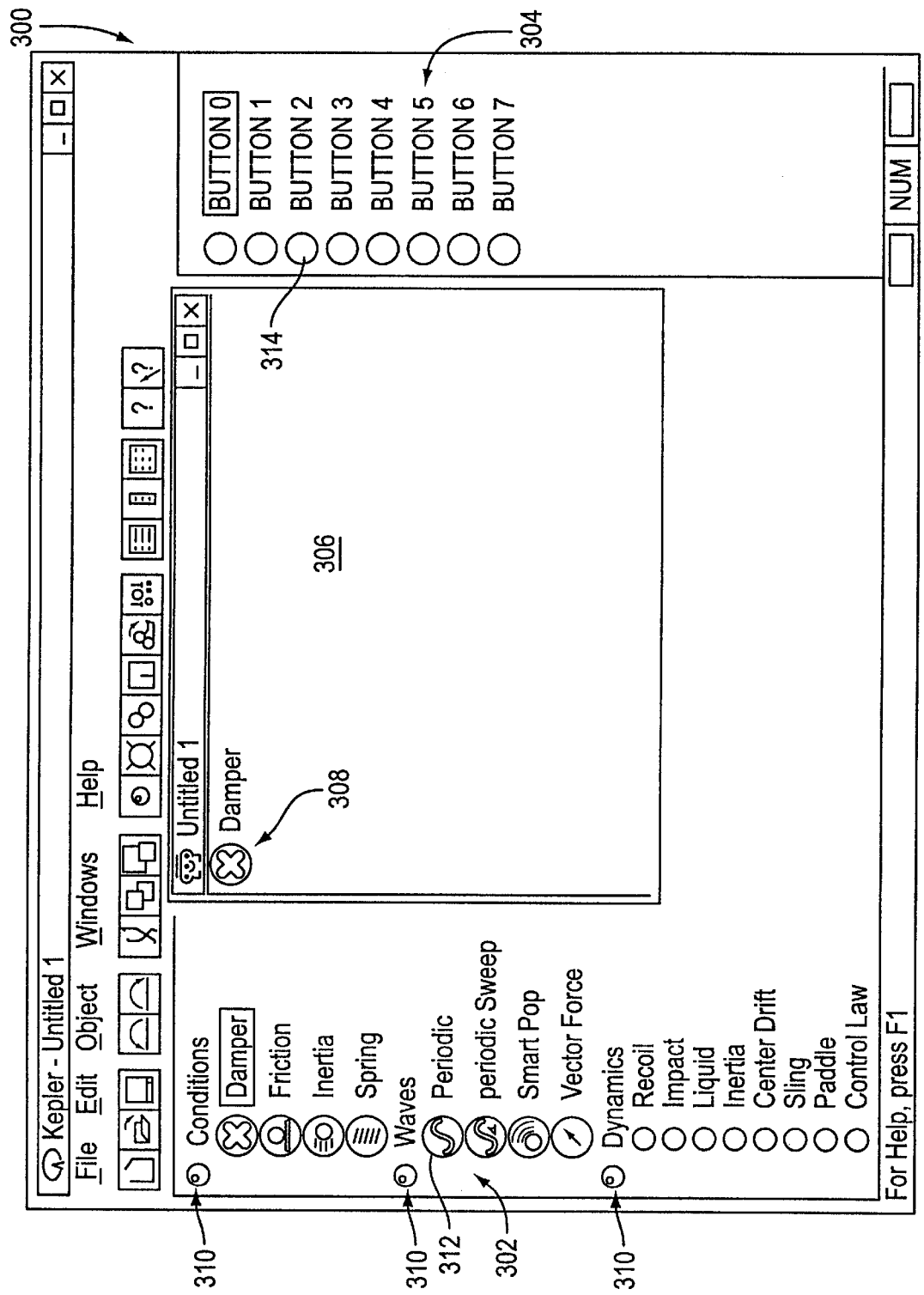
FIG. 3 is a diagram of a displayed interface of the present invention for designing force sensations.

FIG. 3 illustrates a display device 20 displaying an interactive force design interface 300 that enables developers and programmers of force feedback ("users" of the interface) to design and implement force sensations rapidly and efficiently. The graphical environment allows conditions, effects ("waves"), and dynamics to be defined through intuitive graphical metaphors that convey the physical meaning of each parameter involved. As the parameters are manipulated, sensations can be felt in real-time, allowing for an iterative design process that fine-tunes the feel to the designer's exact need. Once the appropriate sensation is achieved, the interface can save the parameters as a resource and automatically generate optimized code in a desired format that can be used directly within an application program. Thus, interface 300 handles most of the force feedback development process from force sensation design to coding. With these tools, force feedback programming becomes a fast and simple process.

The challenge of programming for force feedback is not the act of coding. Force models to provide force sensations are available, and, once the desired force sensation is known and characterized, it is straightforward to implement the force sensation using software instructions. However, the act of designing force sensations to provide a desired feel that appropriately match gaming or other application events is not so straightforward. Designing force sensations and a particular feel requires a creative and interactive process where parameters are defined, their effect experienced, and the parameters arc modified until the sensations are at the desired characterization. For example, when designing conditions, this interactive process might involve setting the stiffness of springs, sizing the deadband, manipulating the offset, and tuning the saturation values. When designing effects, this might involve selecting a wave source (sine, square, triangle, etc.), setting the magnitude, frequency, and duration of the signal, and then tuning the envelope parameters. For a dynamic sensation, this might involve setting the dynamic mass, and then tuning resonance and decay parameters. With so many parameters to choose from, each applicable to a different type of force sensation, there needs to be a fast, simple, and interactive means for sensation design. To solve this need, the graphical interface 300 of the present invention allows a user to rapidly set physical parameters and feel sensations, after which the interface automatically generates the appropriate code for use in a host computer application program.

Interface 300 enables interactive real-time sensation design of conditions, effects, and dynamics, where parameters can be defined and experienced through a rapid iterative process. Thus, it is preferred that a force feedback interface device 14 be connected to the computer implementing interface 300 and be operative to output commanded force sensations. Intuitive graphical metaphors that enhance a programmer's understanding of the physical parameters related to each sensation type are provided in interface 300, thereby speeding the iterative design process. File-management tools are also preferably provided in interface 300 so that designed force sensations can be saved, copied, modified, and combined, thereby allowing a user to establish a library of force sensations. Once sensations are defined, the interface 300 preferably stores the parameters as "resources" which can be used by an application program. For example, by linking a force sensation resource into an application program, the resources can be converted into optimized Direct-X code for use in an application in the Windows environment. Other code formats or languages can be provided in other embodiments. Interface 300 can be implemented by program instructions or code stored on a computer readable medium, where the computer readable medium can be either a portable or immobile item and may be semiconductor or other memory of the executing computer (such as computer 12), magnetic hard disk or tape, portable disk, optical media such as CD-ROM, PCMCIA card, or other medium.

As shown in FIG. 3, the interface 300 has three primary work areas: the sensation pallet 302, the button trigger pallet 304, and the design space 306. Force sensations are created in the design space 306 and can be saved and loaded into that space using standard file handling features.

To create a new force sensation, a sensation type is chosen from the sensation pallet 302. Pallet 302 is shown in an expandable tree format. The root of the tree includes the three classes 310 of force feedback sensations described herein, conditions, waves (effects), and dynamics. Preferably, users can also define their own headings; for example, a "Favorites" group can be added, where force sensations with desirable previously-designed parameters are stored.

In interface 300, the conditions, waves, and dynamics classes are shown in expanded view. These classes may also be "compressed" so as to only display the class heading, if desired. When a class is displayed in expanded view, the interface 300 displays a listing of all the sensation types that are supported by the hardware connected to the host computer 12 for that class. For example, when programming for more recent or expensive hardware supporting a large number of force sensation types, a list including many or all available sensation types is displayed. When programming for older or less expensive interface device hardware that may not implement all the sensations, some sensation types can be omitted or unavailable to be selected in the expanded view. Preferably, interface 300 can determine exactly what force sensations arc supported by a given interface device 14 connected to the host computer by using an effect enumeration process, i.e., the host computer can request information from the interface device, such as a version number, date of manufacture, list of implemented features, etc.

Once a sensation type is chosen from the sensation pallet 302, the sensation type is added to the design space 306. For example, in FIG. 3, an icon 308 for the selected force sensation "Damper" is displayed within the design space 306 window. Icon 308 can now be selected/opened by the user in order to set the parameters for the given sensation type using graphical development tools (described below). Multiple icons can similarly be dragged to the design space to create a more complex force sensation. Once the parameters are specified for the given sensation, the sensation can be saved as a resource file. Using this process, a user can create a diverse library of feel sensations as resource files. Also, predefined libraries of sample resources from third party sources might also be available.

Options displayed in the trigger button pallet 304 can also be selected by the user. Trigger pallet 304 is used for testing force sensations that are going to be defined as button reflexes. For example, a force sensation might be designed as a combination of a square wave and a sine wave that triggers when Button #2 of the interface device is pressed. The square wave would be created by choosing the periodic type 312 from the sensation pallet 302 and defining parameters appropriate for the square wave. A sine wave would then be created by choosing another periodic type 312 from the sensation pallet 302 and defining the parameters appropriate for the sine wave. At this point, two periodic icons 308 would be displayed in the design space window 306. To test the simultaneous output of the square wave and sine wave, the user can just drag and drop these icons 308 into the Button 2 icon 314. Button 2 on the interface device 14 has thus been designed to trigger the reflex sensation when pressed. This process is fast, simple, and versatile. When the user achieves a sensation exactly as desired, the sensation can be saved as a resource file and optimized software code for use in the application program is generated. The Button 2 selection might be provided in other ways in different embodiments. For example, the user might select or highlight the designed force icons in design space 306 and then select the Button 2 icon in pallet 304 to indicate that the highlighted forces will be triggered by Button 2. Furthermore, sounds can also preferably be associated with the button icons in pallet 304 so that a sound is output when the button is pressed, synchronized with the force sensation (s) also associated with that button. Such a feature is described in greater detail in copending patent application Ser. No. 09/243,209, entitled, "Designing Force Sensations for Computer Applications Including Sounds", filed Feb. 2, 1999 and incorporated herein by reference.

FIG. 4 illustrates interface 300 where a force sensation is characterized in the design space 306. When an icon 308 in design space 306 is selected by the user, the icon 308 expands into a force sensation window and graphical environment for setting and testing the physical parameters associated with the selected sensation. For example, in FIG. 4, a spring sensation type 320 has been selected from the condition list 322 and provided as icon 324 in the design space 306. A spring window 326 is displayed in design space 306 when icon 324 is selected. Within spring window 326 are fields 328 characterizing the force, including the axis 330 (and/or direction, degree of freedom, etc.) in which the force is to be applied, the gain 332 (or magnitude) of the force, and the parameters 334 associated with the force sensation. For example, for the spring sensation, the positive stiffness ("coefficient"), negative stiffness ("coefficient"), positive saturation, negative saturation, offset, and deadband of the spring sensation are displayed as parameters. The user can input desired data into the fields 328 to characterize the force. For example, the user has specified that the force is to be applied along the x-axis (in both directions, since no single direction is specified, has specified a gain of 100, and has specified saturation values of 10,000 in positive and negative directions. The user can also preferably specify all or some of the parameters in graphical fashion by adjusting the size or shape of the envelope, the height or frequency of the waveform, the width of the deadband or springs, the location of a wall on an axis, etc. by using a cursor or other controlled graphical object.

As the user inputs values into fields 328, the resulting additions and changes to the force sensation are displayed in an intuitive graphical format in the force sensation window. For example, in the spring sensation window 326, graphical representation 336 is displayed. Representation 336 includes an image 338 of the user object 34 (shown as a joystick, but which also can be shown as other types of user objects), an image 340 of ground, an image 342 of a spring on the right of the joystick 34, and an image 344 of a spring on the left of the joystick 34. Representation 336 models a single axis or degree of freedom of the interface device.

Representation 336 represents a physical, graphical model with which the user can visually understand the functioning of the force sensation. The user object image 338 is displayed preferably having a shape similar to the actual user object of the desired interface device (a joystick in this example). Along the displayed axis, in both directions, there are spring images 342 and 344 as defined by a positive stiffness parameter (k) and a negative stiffness parameter (k). Graphically, the large stiffness of the spring to the right (coefficient of 80) is represented as a larger spring image 342. The origin of the spring condition is shown at a center position 346, since the offset parameter 348 is zero. If the offset has a positive or negative magnitude, the origin would be displayed accordingly toward the left or right. The deadband region is shown graphically as the gap between the user object image 338 and the spring images 342 and 344.

In the preferred embodiment, the graphical representation further helps the user visualize the designed force sensation by being updated in real time in accordance with the movement of the user object 34 of the connected interface device 14. User object image 338 will move in a direction corresponding to the movement of user object 34 as caused by the user. The user object is free to be moved in either the positive or negative direction along the given axis and encounter either a positive or negative stiffness from the spring sensation. Thus, if the user object is freely moved to the left from origin 346, the joystick image 338 is moved left in the deadband region and no force is output. When the user object 34 encounters the spring resistance, the joystick image 338 is displayed contacting the spring image 344. If there is no deadband defined, the spring images 342 and 344 are displayed as contacting the joystick image 338 at the center position. The edge stop images 350 define the limits to the degree of freedom; for example, when the user object 34 is moved to a physical limit of the interface device along an axis, the joystick image 338 is displayed as contacting an appropriate edge stop image 350.

When the joystick image 338 contacts a spring image 342 or 344, that spring image 342 is displayed compressed an appropriate amount. Once a spring stiffness is encountered, the resistance force increases linearly with compression of the spring (as is true of a real spring). The amount of compression felt by the user is correlated with the amount of compression shown by spring image 342. If the programmer has defined a saturation value for force opposing movement in the positive direction, the force output would cease increasing with compression once the saturation limit in the positive direction was exceeded.

Once the user has tested the input parameters and settings, he or she may change any of the existing information or add new information by inputting data into fields 328. Any such changes will instantly be displayed in window 326. For example, if the user changes the coefficient (stiffness) of the spring on the right, the spring image 342 will immediately be changed in size to correlate with the new value. The user thus gains an intuitive sense of how the sensation will feel by simply viewing the representation 336. The user can then determine how the sensation will feel with more accuracy (fine tuning) by moving the user object and feeling the sensation. Thus, the graphical representation 336 as displayed clearly demonstrates to the user the various effects of parameters on the force sensation and additionally allows the user to experience the forces coordinated with the graphical representation.

Other graphical representations can be displayed in interface 300 for spatial texture conditions, wall conditions, damping conditions, inertia conditions, friction conditions, etc. as described in application 08/877,114. In other embodiments, a 2-dimensional force sensation (i.e. two degrees of freedom) can be displayed in the window 326 by showing an overhead representation of the user object. For example, a circular user object image can be displayed in the middle of two sets of spring images in a cross formation, each set of springs for a different degree of freedom.

Figure 5:
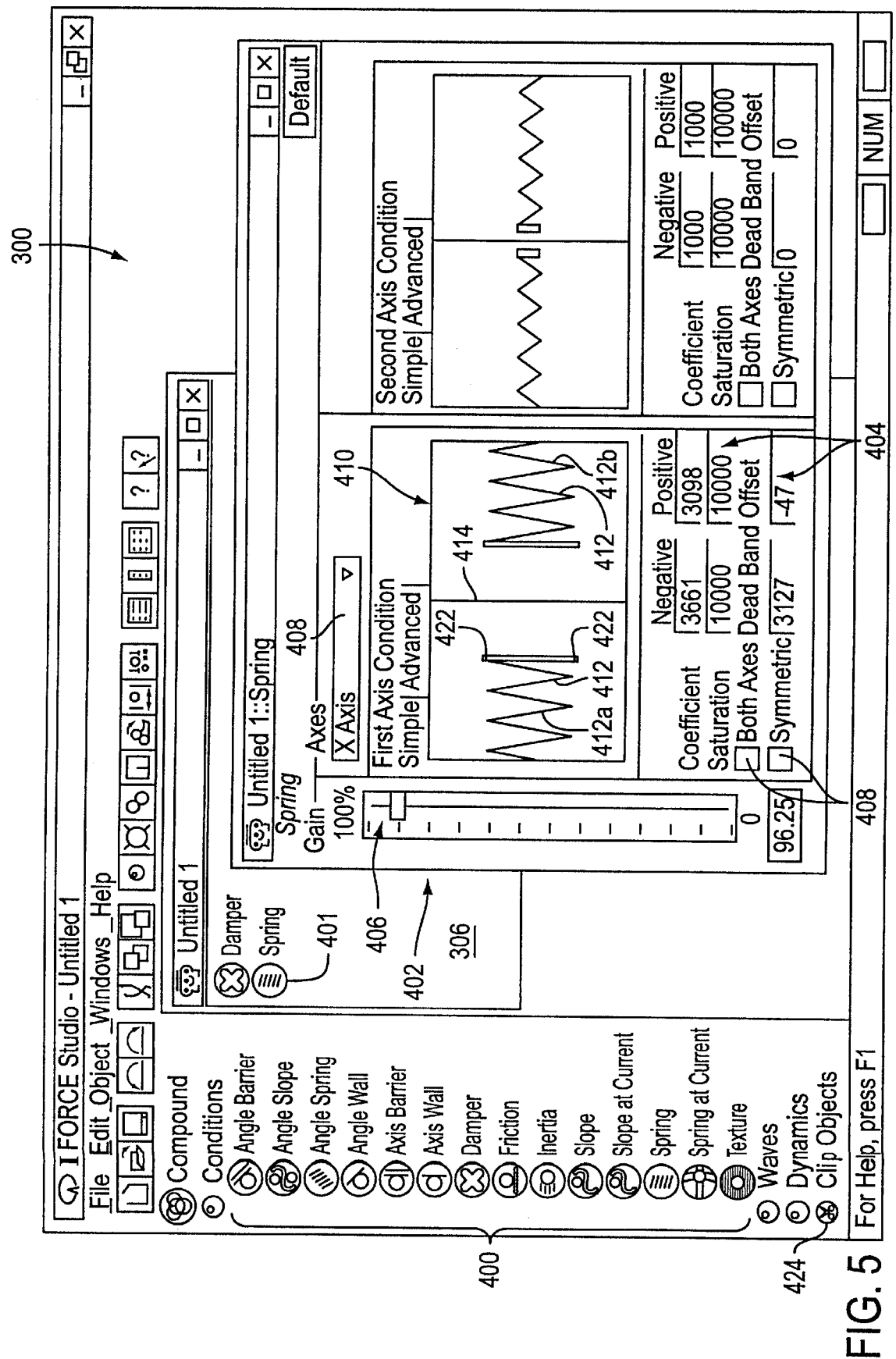
FIG. 5 are diagrams of the interface of FIG. 3 in which an alternative design window for a spring condition is displayed.
Figure 6:
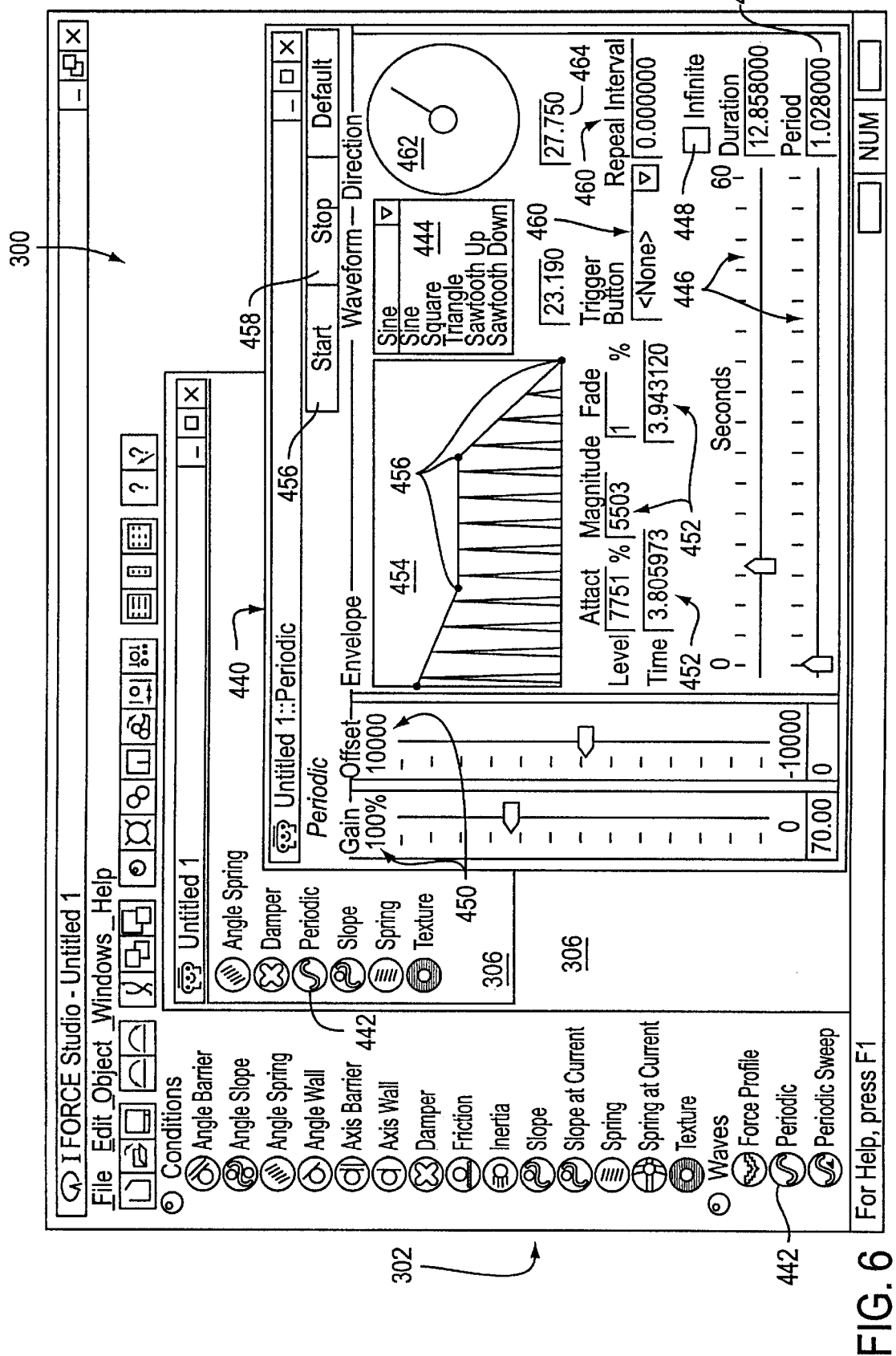
FIG. 6 is a diagram of the interface of FIG. 3 in which a design window for a periodic wave is displayed.

FIG. 5 illustrates interface 300 displaying an alternative graphical representation of a spring condition. FIG. 5 also shows the variety of conditions 400 available to be selected from the condition list. The representation used in FIG. 4 can be used for a spring condition as well. In FIG. 6, the user has selected spring icon 401 in the design space 306. A spring condition window 402 is displayed in the design space 306 when icon 401 is selected. The spring window 402 includes parameters 404 for characterizing the spring force, as well as gain 406 and axis control 408. A window is displayed for each axis in which the force is to be applied. A greyed out window for the second axis condition indicates that no force is presently assigned to that axis.

In first axis window 410, a simple mode and advanced mode is available; in FIG. 5, simple mode has been selected by the user. Spring images 412 are displayed from each edge of window 410, where spring image 412a is for the negative direction and spring image 412b is for the positive direction. When the user moves the user object along the displayed axis (the x-axis), line 414 moves in the corresponding direction. When the line 414 moves into a spring image 412, the microprocessor outputs the specified spring force on the user object so the user can feel the characterized force sensation. As the user object continues to be moved into the spring, the spring image compresses as a real spring would. The empty space between spring images 412 indicates the deadband region where no forces are output. In the preferred embodiment, the user may adjust the stiffness (k) of the spring force by selecting control points 422 at the edges of the front of the spring images 412 with a cursor. The user can drag the control points to adjust the widths of the spring images, which in turn adjusts the stiffness parameter. A thicker spring image indicates a larger stiffness parameter, and a stronger spring force. The user may also move the front ends of the spring images closer together or further apart, thus adjusting the deadband and offset parameters. As parameters are adjusted, they are sent to the local microprocessor which then implements the newly characterized force on the user object (if appropriate).

Icons are also preferably provided to help the user with the design of force sensations from previously stored force sensations. For example, clip objects icon 424, when selected, provides the user with a list or library of predefined, common force sensations that the user can use as a base or starting point, i.e., the user can modify a common spring condition configuration to quickly achieve a desired force. This library can be provided, for example, from commercial force providers or other sources, or can be a custom-made library.

FIG. 6 illustrates interface 300 with a graphical representation for a periodic wave (effect) force sensation. Periodic window 440 is displayed in response to the user selecting (e.g., double clicking on) periodic effect icon 442 that has been dragged into design space 306. In window 440, waveform source field 444 allows a user to select from multiple available types of signal wave sources for the effect. The user is allowed to select the duration of the periodic wave using sliders 446, and may also select an infinite duration with box 448. The gain and offset may be selected using sliders 450, and other parameters are provided in fields 452. A graphical representation of the periodic waveform is displayed in window 454 having a shape based on the wave source chosen and based on the other selected parameters (or default parameters if no parameters are chosen). Envelope parameters in fields 452 can be graphically adjusted by the user by dragging control points 456 of the waveform. A frequency of the waveform can be adjusted by dragging a displayed wave to widen or narrow the displayed oscillations of the wave, or by specifying the period in field 458. Trigger buttons for the periodic wave can be determined in fields 460 to assign physical button(s) or controls to the designed effect, and the direction of the periodic wave in the user object workspace is determined using dial 462 and field 464. The repeat interval field 460 allows a user to specify the amount of time before the effect is repeated if the designated button is held down. These parameters and characteristics can be entered as numbers in the displayed input fields or prompts, or can be input by dragging the graphical representation of the waveform in window 454 with a cursor to the desired shape or level.

The parameters, when specified, cause the graphical representation to change according to the parameters. Thus, if the user specifies a particular envelope, that envelope is immediately displayed in the window 454. The user can thus quickly visually determine how specified parameters exactly affect the periodic waveform.

To test the specified periodic wave, the user preferably selects start button 456, which instructs the microprocessor to output the specified force sensation over time to the user object so the user can feel the force sensation when grasping the user object. In the preferred embodiment, a graphical marker, such as a vertical line or pointer, scrolls across the display window 454 from left to right indicating the present portion or point on the waveform currently being output. Or, the waveform can be animated; for example, if an impulse and fade is specified, the wave is animated so that the impulse portion of the waveform is displayed when the impulse force is output on the user object, and the fade is displayed when the output force fades down to a steady state level. Since graphical display is handled by the host computer and force wave generation is (in one embodiment) handled by a local microprocessor, the host display of the marker needs to be synchronized with the microprocessor force generation at the start of the force output. The user can stop the output of the periodic sensation by selecting the stop button 458. Other features of a periodic force design interface are described in patent application Ser. No. 08/877,114.

As described above, the normal procedure for a force designer in using interface 300 is to input parameters for a selected type of force sensation, test the way the force feels by manipulating the user object, adjusting the parameters based on the how the force feels, and iteratively repeating the steps of testing the way the force feels and adjusting the parameters until the desired force sensation is characterized. Normally, the user would then save the resulting parameter set describing this force sensation to a storage medium, such as a hard disk, CDROM, non-volatile memory, PCMCIA card, tape, or other storage space that is accessible to a computer desired to control the force feedback. The user also preferably assigns an identifier to the stored parameter set, such as a filename, so that this force sensation can be later accessed. Thus, other application programs running on a host computer can access the parameter set by this identifier and use the designed force sensation in an application, such as in a game, in a graphical user interface, in a simulation, etc.

Once a force sensation has been designed using the graphical tools as described above, the definition can be saved as a resource of parameters. By accessing the interface resource from an application program, the resource is converted automatically from a parameter set to code in the desired language or format, e.g., DirectX by Microsoft® Corporation for use in the Windows™ operating system. For example, the force feedback resource can be provided as or in a DLL (Dynamic Linked Library) that is linked to an application program. In one embodiment, the DLL can provide the application program with effects defined as completed DirectX Structs (DI_Struct), where the application programmer can then create effects by using the CreateEffect call within DirectX (or equivalent calls in other languages/formats). Or, the DLL can perform the entire process and create the effect for the application program, providing the programmer with a pointer to the sensation. One advantage of using the first option of having the programmer call CreateEffect is that it gives the programmer the opportunity to access the parameters before creating the effect so that the parameters can be modified, if desired.

Compound Force Sensations

Figure 7:
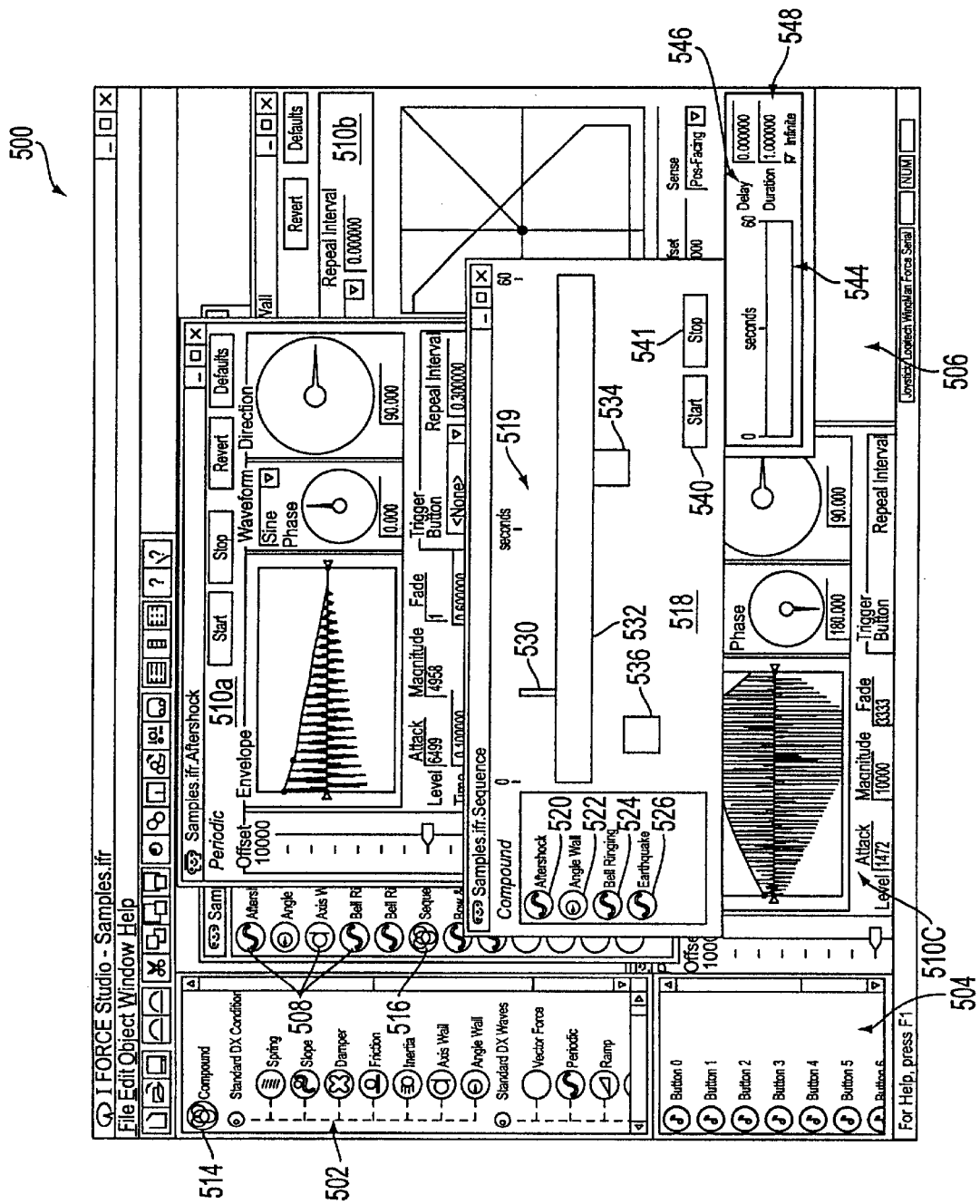
FIG. 7 is a diagram of an embodiment of an interface of the present invention allowing the design of compound force sensations.

FIG. 7 illustrates a force design interface 500 including a compound force design feature of the present invention. This feature allows a user to easily design and test sequences of multiple force sensations instead of having to separately test each individual force sensation. This allows faster creation of compound force sensations as well as greater flexibility when designing force sensations that are intended to be output simultaneously for at least part of the duration of the force sensations. Furthermore, another feature of the present invention allows sounds to be designed and their start times adjusted alongside compound force sensations to correlate with desired force sensations.

Interface 500 includes a sensation palette 502, a button trigger palette 504, and a design space 506, similar to these features in the interface 300 described above. The design space can include a number of icons 508 representing different force sensations which can be stored in a particular "force resource" file that is written out by the interface 500. Each force sensation in the design space 506 can be modified by calling up an associated force design window 510 which includes a graphical representation of the particular force sensation and several controls to allow modification of the force sensation, as described in detail above. For example, FIG. 7 shows a design window 510a for an "aftershock" periodic force sensation, a design window 510b for an "angle wall" force sensation, and a force design window 510c for a "bell ringing" force sensation. The parameters of each force sensation can be adjusted individually similarly as described with reference to the above embodiments.

Interface 500 also includes a compound force sensation design feature, which is accessed by the user through the use of compound force sensation controls. Preferably, a compound force palette icon 514 is available in the sensation palette 502, like any other force sensations in the palette 502. The user can create a compound force "container" by dragging the compound icon 514 into the design space 506, similar to any other force sensation as described in the embodiments above. A compound force sensation container icon 516 shows the created compound container in the design space with the other created force sensations. Preferably, the user provides the created compound force container with a name, which will be the identifier for the "compound force sensation," which is the collection of individual force sensations in the compound container. For example, the identifier for container 516 is "Sequence."

As with any of the force sensations, the user preferably accesses the details of the compound force container by selecting (e.g. double-clicking) the icon 516. This causes a compound window 518 to be displayed (or other screen area that displays data related to compound force sensations). Upon creation, no force sensations are included in the compound container, and thus no force sensation icons are displayed in the compound window 518. The user can then select individual force sensations 508 to be included in the compound container, e.g., force sensation icons 508 can be dragged and "dropped" into the window 518 (or the force sensations can be dragged into the compound icon 516). Preferably, the force sensations are displayed in design space 506 and thus were previously created by the user in interface 500 or loaded into the interface 500 from an external source such as a storage device (hard drive, CDROM, etc.) or another computer/device networked to the host computer running the interface 500. Alternatively, individual force sensations not displayed in design space 506 can be imported into the compound window. A compound container such as icon 516 can also preferably be associated with a button icon in button palette 504, similarly to individual force sensations.

Window 518 in FIG. 7 shows an example of compound window 518 where four individual force sensations 508 have been dragged into the window 518, including "aftershock" force sensation 520, "angle wall" force sensation 522, "bell ringing" force sensation 524, and "earthquake" force sensation 526. To the right of these displayed icons, a time scale 519 is displayed indicating a range of seconds numbered from zero to 60, where each mark on the time scale represents 5 seconds of time. Below the time scale, a horizontal bar graph is displayed for each of the force sensation icons in the window 518. Thus, bar graphs 530, 532, 534, and 536 are associated with force sensations 520, 522, 524, and 526, respectively, and represent the start times and durations of each of the force sensations. Preferably, each bar graph is displayed in a different color or other visual characteristic. Bar graph 530 shows a duration for the "aftershock" force sensation 520 starting at about the 11$^{th}$ second and lasting about 1–2 seconds, which indicates that the jolts from the aftershock are intended to be very short. Bar graph 532 shows an infinite duration for the angle wall sensation 522, which indicates that the angle wall need not have a duration such as normal periodics, but can be always present (and such is the default duration); the angle wall, for example, has an output dependent on the position of the user manipulandum, such as when a user-controlled cursor moves into the displayed wall. Bar graph 534 indicates that the bell ringing sensation 524 begins at about second 35 and lasts to about second 40. Finally, the earthquake sensation 526 is shown to begin at about the $3^{rd}$ second and last until about the $9^{th}$ second. Thus, by examining the window 518, the user can easily determine that the earthquake sensation is intended to last for some time, followed by a small pause and then the aftershock sensation.

A great amount of flexibility is provided for the user of the compound window 518 in setting the start times and durations of the individual force sensations displayed in the window 518. The user can preferably adjust the start time of a force sensation by selecting a particular bar graph and moving it horizontally using an input device such as a keyboard, mouse or joystick. For example, the user can select the bar graph 536 with a cursor and drag the entire bar graph to the right, so that the force sensation has a new start and end time, but the duration remains constant. Alternatively, the user can also adjust the duration of each force sensation by changing the start time and/or end time of a bar graph. For example, the cursor can be moved over the left edge of a bar graph, so that only the left edge is selected and dragged when the user moves the input device horizontally. The user can adjust the right side of a bar graph in a similar fashion. In other embodiments, the user can adjust the duration, start time, and end time of a bar graph by inputting numbers into entry fields; this can allow more precision in adjusting the bar graphs, e.g. a start time of 3.3 seconds can be entered if such precision is desired. However, such entry fields can alternatively (or additionally) be included in the individual force sensation design windows 510, as described below.

When a change is made by the user (or by a program, script, imported file, data, etc.) to a bar graph in compound window 518, that change is preferably immediately made to that force sensation and reflected in the individual force sensation design windows 510 if those windows 510 are currently displayed. For example, if the angle wall bar graph 532 is modified, the bar graph 544 displayed in the angle wall design window 510b is modified in the same way. Furthermore, the displayed delay (start time) field 546 and duration field 548 for the design window 510b are preferably updated in accordance with the bar graphs 544 and 532. Preferably, the other force sensation design windows 510 include a bar graph similar to bar graph 544 which corresponds to a bar graph in compound window 518. Likewise, changes made to any parameters or characteristics of the individual force sensations as displayed in windows 510 are preferably immediately updated in a corresponding fashion to those force sensations in the compound force sensation, and the changes are displayed in compound window 518 if window 518 is displayed.

A start button 540 is also preferably provided to allow the user to output or "play" the force sensations in the compound window using a force feedback device connected to the host computer running the interface 500. When the start button 540 is selected, the user can immediately feel the force sensations and their respective start times and durations with respect to each other. Preferably, a pointer or marker (not shown) is displayed on the time scale 519 and/or bar graphs which moves from the left to the right and indicates the current point in time and the sections of each bar graph currently being output as forces (if any). If an individual force sensation does not have the desired duration or start time, the user can iteratively adjust those parameters in the compound window 518 and play the forces until the desired effect is achieved. A stop button 541 can also be included to stop the output of the compound force sensation when selected. Furthermore, a user is preferably able to start the output of any portion of the compound force sensation by selecting a particular point in time with reference to the time scale 519. For example, the user can select a point at the 30-second mark and the force sensations will be output beginning from that selected point. Alternatively, the user can select a start point at the 30-second mark and an end point at the 40-second mark, for example, to output the compound force sensations within that range of time.

The compound container can preferably be stored as a separate compound file that includes references or pointers to the included force sensations. Alternatively, the force sensation data can be stored in the compound file. In some embodiments, a compound force sensation can include one or more "sub" compound force sensations, where each sub compound sensation includes one or more individual force sensations; force sensations in each "sub" compound container can be displayed or hidden from view as desired. Furthermore, the sub compound containers can include lower-level compound force sensations, and so on. The information for each sub compound container can be stored in the highest-level compound sensation file, or each sub compound sensation can be stored separately and referenced by data in higher-level compound sensation files.

In other embodiments, a compound force sensation can be selected and represented in other ways. For example, a menu option can be used to create a compound container, and the individual force sensations within the container can be represented using vertical bar graphs, circular graphs, or other graphical representations. In addition, additional information concerning each included force sensation can be displayed in the compound window 518, such as the periodic graphs, force magnitude information, trigger events, etc.

In a different embodiment, sounds can also be designed and displayed or indicated in compound window 518. For example, one or more sound files, such as a "wav" file, mp3 file, or other standard, can be associated with a button icon in palette 504. As described in co-pending patent application 09/243,209, entitled, "Designing Force Sensations for Computer Applications Including Sounds", filed Feb. 2, 1999, when one or more sound files have been attached to a button icon, the sound files are played on speakers attached to the computer when the associated button on the force feedback interface device is pressed by the user. In addition, any force sensations assigned to that button icon are played at the same time as the sound when the button is pressed. Preferably, the start of the force sensation is synchronized with the start of the sound effect played. The force sensation and sound can also be played when a control in interface 500 is activated by the user, such as a graphical button or icon in interface 500. When one or more sounds are associated with a button icon, an indicator is displayed that indicates the button icon has associated sounds. Furthermore, one or more compound force sensations can also be associated with a button icon in button palette 504 so that all the force sensations in the compound container(s) will begin at the press of the associated physical button and in conjunction with any sounds associated with that button icon.

Alternatively, one or more sounds or sound files can be associated directly with an individual force sensation 508. An indicator closely associated with the icons of the force sensations, such as icons 508, preferably indicates that sounds are associated with that force sensation; for example, a musical note image can be provided on force sensations having associated sounds. In some embodiments, sounds can also be directly associated with a compound force sensation (e.g., container 516 and window 518) rather than associated with an individual force sensation or with a button icon.

In some embodiments, if compound window 518 is used, the sounds associated with a force sensation, associated with the compound container, or associated with a button with which the compound container is also associated, can preferably be displayed as bar graphs within the time scale 519 similar to the bar graphs for the force sensations. For example, if an individual force sensation has a directly-associated sound, a note image can be provided on the force sensation icon 520, 522, 524, or 526, or can be displayed alongside the icon. Alternatively, a sound bar graph can be displayed alongside or within the bar graph 530, etc. for the force sensation. For example, a smaller, thinner bar graph representing the duration of the associated sound can be displayed within the bar graph 536 to indicate the starting time and duration of the associated sound. If a sound is associated with the entire compound force sensation, then separate sound bar graphs can be displayed after or before the bar graphs for the individual force sensations to be referenced by the same time scale 519.

The user can preferably adjust the start time (delay) and/or duration of the sounds similarly to adjusting the force sensations in the window 518 to allow flexibility in determining when sounds will start and stop with respect to force sensations. In yet other embodiments, sounds can be displayed as waveforms similarly to the waveforms for force sensations shown in design windows 510*a* and 510*c*, and can be adjusted in magnitude, duration, start time, or even more fundamentally if advanced sound editing features are included in the interface.

While this invention has been described in terms of several preferred embodiments, it is contemplated that alterations, permutations and equivalents thereof will become apparent to those skilled in the art upon a reading of the specification and study of the drawings. For example, many different parameters can be associated with dynamic sensations, conditions, and effects to allow ease of specifying a particular force sensation. These parameters can be presented in the graphical interface of the present invention, including in the compound force sensation windows. Many types of different visual metaphors can be displayed in the interface tool of the present invention to allow a programmer to easily visualize changes to a force sensation and to enhance the characterization of the force sensation. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A method for implementing a force sensation design interface, said method comprising:

causing a display of said force sensation design interface on a display device of a host computer;

receiving input from a user to said force sensation design interface, said input selecting a plurality of individual force sensations to be commanded by said host computer and output by a force feedback interface device, said force feedback interface device including a manipulandum physically engageable by a user and moveable in at least one degree of freedom, wherein each of said individual force sensations is provided with an edit display area displayed in said force sensation design interface;

including said plurality of selected force sensations in a compound force sensation based on input received from said user; and causing a display of a time-based graphical representation of said compound force sensation, said representation displaying each of said individual force sensations included in said compound force sensation.

2. A method as recited in claim 1 further comprising commanding said compound force sensation to be output by said force feedback interface device coupled to said host computer such that said individual force sensations are output to said manipulandum in conjunction with updating said graphical demonstration of said compound force sensation, such that said graphical representation provides said user with a visual demonstration of said individual force sensations included in said compound force sensation.

3. A method as recited in claim 1 further comprising:

receiving changes from said user to at least one of said individual force sensations in said compound force sensation, said changes received in said edit display area of said changed individual force sensation, said changes provided after said compound force sensation is output; and causing a display of said changes in said graphical representation of said compound force sensation.

4. A method as recited in claim 1 further comprising:

receiving changes from said user to said compound force sensation, said changes received in a display area of said compound force sensation, said changes provided after said compound force sensation is output; and effecting said changes in said display area of said compound force sensation receiving said changes.

5. A method as recited in claim 1 further comprising storing said compound force sensation to a storage medium accessible to said host computer.

6. A method as recited in claim 1 further comprising accessing said stored compound force sensation from an application program different than said force sensation design interface.

7. A method as recited in claim 1 wherein said time-based graphical representation includes a bar graph for each of said individual force sensations in said compound force sensation indicating a start time and duration of each of said individual force sensations relative to each other.

8. A method as recited in claim 2 wherein said updating of said graphical demonstration includes moving a marker across a plurality of bar graphs, each indicating a time period during which one of said individual force sensations is output.

9. A method as recited in claim 2 wherein a sound is associated with said compound force sensation, wherein a start of a sound is synchronized with a start of said compound force sensation.

10. A method as recited in claim 9 wherein said sound is selected by said user in said force sensation design interface and said user associates said sound with said compound force sensation.

11. A method as recited in claim 1 wherein said compound force sensation also includes a lower-level compound force sensation, said lower-level compound force sensation including at least one individual force sensation.

12. A method as recited in claim 1 wherein said individual force sensations include conditions, effects, and dynamics.

13. An apparatus for implementing a force sensation design interface, said apparatus comprising:

means for causing a display of said force sensation design interface on a display device of a host computer, said means for displaying providing an edit window for each individual force sensation to be created or edited by said user in said force design interface;

means for receiving input from a user to said force sensation design interface, said input selecting a plurality of said individual force sensations to be commanded by said host computer and output by a force feedback interface device, said force feedback interface device including a manipulandum graspable by a user and moveable in a degree of freedom; and means for including said selected force sensation with at least one other individual force sensation in a compound force sensation based on input received from said user, wherein said means for causing a display displays a time-based graphical representation of said compound force sensation.

14. An apparatus as recited in claim 13 wherein said time-based graphical representation includes a bar graph for each of said individual force sensations indicating a start time and duration of each of said individual force sensations relative to each other.

15. An apparatus as recited in claim 13 further comprising means for commanding said compound force sensation to be output by said force feedback interface device coupled to said host computer such that said compound force sensation is output to said manipulandum in conjunction with updating said graphical demonstration of said compound force sensation.

16. An apparatus as recited in claim 13 further comprising means for receiving changes to at least one of said individual force sensations from said user after said force sensation is output and causing a display of said changes in said graphical representation of said compound force sensation.

17. A computer readable medium including program instructions executable on a computer for providing a force sensation design interface implemented by said computer, said program instructions performing steps comprising:

causing a display of said force sensation design interface on a display device of a host computer;

receiving input from a user to said force sensation design interface, said input selecting an individual force sensation to be commanded by said host computer and output by a force feedback interface device, said force feedback interface device including a manipulandum graspable by a user and moveable in a degree of freedom;

including said selected force sensation with at least one other individual force sensation in a compound force sensation based on input received from said user; and causing a display of a compound force sensation window in said design interface, said window including a time-based graphical representation of said individual force sensations; and outputting said compound force sensation to said force feedback interface device to be felt by said user, wherein a marker moves across said time-based graphical representation to indicate a current point in time with respect to said individual force sensations.

18. A computer readable medium as recited in claim 17 including program instructions for receiving additional input from said user to change said characteristics of said individual force sensations and adjust the time period during which at least one of said individual force sensations is to be output.

19. A computer readable medium as recited in claim 17 including program instructions for writing said compound force sensation to a storage medium, said compound force sensation being accessible to application programs implemented on said computer and controlling force feedback.

20. A method for implementing a force sensation design interface, said method comprising:

enabling a display of said force sensation design interface on a display device of a host computer;

enabling a reception of input from a user to said force sensation design interface, said input selecting a plurality of individual force sensations to be commanded by said host computer and output by a force feedback interface device, said force feedback interface device including a manipulandum physically engageable by a user and moveable in at least one degree of freedom, wherein each of said individual force sensations is provided with an edit display area displayed in said force sensation design interface;

enabling an inclusion of said plurality of selected force sensations in a compound force sensation based on input received from said user; and enabling a display of a time-based graphical representation of said compound force sensation, said representation displaying each of said individual force sensations included in said compound force sensation.

21. A method as recited in claim 20 further comprising enabling commanding of said compound force sensation to be output by said force feedback interface device coupled to said host computer such that said individual force sensations are output to said manipulandum in conjunction with updating said graphical demonstration of said compound force sensation, such that said graphical representation provides said user with a visual demonstration of said individual force sensations included in said compound force sensation.

22. A method as recited in claim 20 including program instructions for receiving additional input from said user to change said characteristics of said individual force sensations and adjust the time period during which at least one of said individual force sensations is to be output.

23. A method as recited in claim 20 further comprising:

enabling a reception of changes from said user to at least one of said individual force sensations in said compound force sensation, said changes received in said edit display area of said changed individual force sensation, said changes provided after said compound force sensation is output; and enabling a display of said changes in said graphical representation of said compound force sensation.

24. A method as recited in claim 20 further comprising:

enabling a reception of changes from said user to said compound force sensation, said changes received in a display area of said compound force sensation, said changes provided after said compound force sensation is output; and enabling said changes to take effect in said display area of said compound force sensation receiving said changes.

25. A method as recited in claim 20 wherein said time-based graphical representation includes a bar graph for each of said individual force sensations in said compound force sensation indicating a start time and duration of each of said individual force sensations relative to each other.

26. A method as recited in claim 21 wherein said updating of said graphical demonstration includes moving a marker across a plurality of bar graphs, each indicating a time period during which one of said individual force sensations is output.

27. A method as recited in claim 21 wherein a sound is associated with said compound force sensation, wherein a start of a sound is synchronized with a start of said compound force sensation.

28. A method as recited in claim 20 wherein said compound force sensation also includes a lower-level compound force sensation, said lower-level compound force sensation including at least one individual force sensation.

29. A method as recited in claim 24 further comprising enabling a storage of a plurality of parameters characterizing said force sensation to a storage medium accessible to said host computer, and further comprising enabling an access of said stored plurality of parameters by an application program different than said design interface, said application program using said plurality of parameters to output said characterized force sensation during execution of said application program.

30. A method as recited in claim 20 wherein at least one of said selected individual force sensations is a periodic force sensation, and wherein said graphical representation of said periodic force sensation is an image of a periodic waveform.

* * * * *